(12) United States Patent
Simpson

(10) Patent No.: US 6,357,584 B1
(45) Date of Patent: Mar. 19, 2002

(54) ITEM AND PRODUCT SAMPLE CARD WITH VIDEO OR AUDIO DEVICE CARRIER

(75) Inventor: William E. Simpson, Lake Oswego, OR (US)

(73) Assignee: CDcoupon, LLC, West Linn, OR (US)

( * ) Notice: Subject to any disclaimer, the term of this patent is extended or adjusted under 35 U.S.C. 154(b) by 0 days.

(21) Appl. No.: 09/799,235

(22) Filed: Mar. 5, 2001

Related U.S. Application Data

(63) Continuation-in-part of application No. 09/696,331, filed on Oct. 25, 2000, now Pat. No. 6,273,249.

(51) Int. Cl.[7] ............................................. B65D 85/57
(52) U.S. Cl. ................................. 206/308.1; 206/232
(58) Field of Search ........................... 206/308.1, 307, 206/309–313, 232, 493

(56) References Cited

U.S. PATENT DOCUMENTS

| | | | | |
|---|---|---|---|---|
| 5,259,498 A | * | 11/1993 | Weisburn et al. | 206/309 |
| 5,284,243 A | * | 2/1994 | Gerlardi et al. | 206/310 |
| 5,284,248 A | * | 2/1994 | Dunker | 206/310 |
| 5,850,912 A | * | 12/1998 | Ganser et al. | 206/308.1 |
| 5,890,590 A | * | 4/1999 | Doodson | 206/308.1 |
| 5,893,455 A | * | 4/1999 | Biedebach et al. | 206/308.1 |
| 5,915,550 A | * | 6/1999 | Gartz | 206/308.1 |
| 5,971,143 A | * | 10/1999 | Yoshioka | 206/308.1 |
| 6,179,119 B1 | * | 1/2001 | Manoogian | 206/308.1 |

* cited by examiner

*Primary Examiner*—Luan K. Bui
(74) *Attorney, Agent, or Firm*—Whiteford, Taylor & Preston LLP; Gregory M. Stone, Esq.

(57) ABSTRACT

A card device including a front card portion and a back card portion hinged together in a manner which enables the card to be opened and closed. The back card portion includes spaced front, rear and side panels which define an interior space therebetween. The card further includes a tape cartridge, such as a VHS video or audio cassette tape, having a drive gear defining an open recess in the tape cartridge, and a carrier device including a carrier portion containing a novelty item, product sample, or other item of value or perceived value. The carrier device and the tape cartridge are positioned in nested relation within the interior space of the back card portion such that the carrier portion is received within the open recess in the tape cartridge. An alternative embodiment uses a compact disk case as the card and a recess in the disk carrier for receiving the novelty item, product sample, or other item.

12 Claims, 7 Drawing Sheets

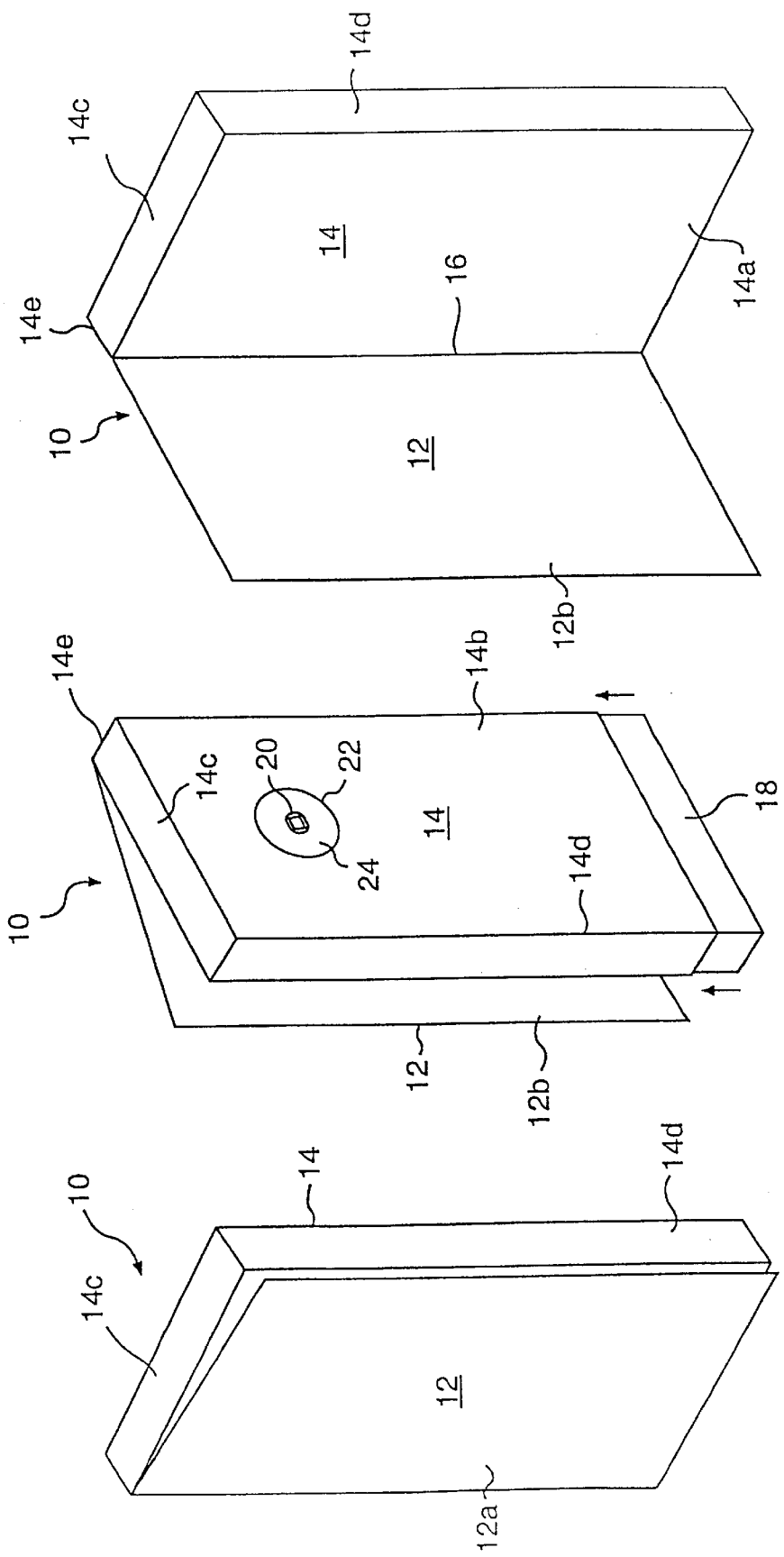

ITEM AND PRODUCT SAMPLE CARD WITH VIDEO OR AUDIO DEVICE CARRIER

CROSS-REFERENCE TO RELATED APPLICATIONS

This application is a Continuation-in-Part Application of U.S. application Ser. No. 09/696,331, filed Oct. 25, 2000 by the inventor herein, U.S. Pat. No. 6,273,249 and entitled "Novelty Item and Product Sample Card With Video Or Audio Device Carrier", the disclosure of which is hereby incorporated by reference to the extent that it does not conflict with the disclosure herein.

BACKGROUND OF THE INVENTION

The present invention relates to the field of novelty item and product sample cards, and, more particularly, to an improved card having one or more novelty items, product samples, or other items of value, contained therein in a secure and visible manner along with a video and/or audio cassette or compact disk.

In the past, numerous cards, such as greeting or special occasion cards, have been available in a variety of shapes and sizes and with a variety of different decorative images, indicia and/or messages thereon. Such cards are often purchased along with a separate gift item to be presented to the recipient of the gift as a complement to the gift. A variety of cards have also been made with means therein for holding a toy, novelty or gift item, such as a piece of candy or a dog biscuit, as evidenced by U.S. Pat. Nos. 4,152,865 and 4,203,516. Cards have also been constructed in the past in a manner which enables an audio cassette to be contained therein, as evidenced by U.S. Pat. No. 4,433,780. Other cards have been distributed by way of bulk mailings soliciting new customers for computer-related services, or describing a particular manufacturer's goods or services, which cards are packaged with a compact disk and are imprinted with a variety of advertising and related materials, and also at times are packaged with various informational inserts or brochures providing additional detail relating to such goods or services. Prior art cards, however, have not heretofore provided a card construction and configuration which enables an item of value or perceived value to be packaged therein in a secure, visible and compact manner, along with a video and/or audio cassette or compact disk.

Thus, a need exists for an improved card which provides a means for securely and decoratively mounting a novelty item, product sample or the like therein, while also providing a carrier for an audio and/or video cassette or compact disk.

SUMMARY OF THE INVENTION

It is therefore a primary object of the present invention to provide an improved card which contains one or more items of value and a video cassette, audio cassette, or compact disk (e.g., CD-ROM, DVD, and the like).

A further object of the present invention is to provide an improved card which is particularly adapted for securely containing one or more novelty items, product samples or the like.

Another object of the instant invention is to provide an improved card which enables one or more novelty items, product samples or the like to be displayed thereon in a decorative and readily visible manner, while also preventing or deterring removal of the novelty items, product samples or the like by an unauthorized person at the point of purchase for the card or elsewhere.

Yet another object of the instant invention is to provide an improved card containing both a video tape and one or more novelty items, product samples or the like which is compact in size and can easily and inexpensively be manufactured.

A more specific object of the instant invention is to provide an improved card which takes advantage of the size and shape of a VHS video cassette contained within the card for displaying one or more novelty items, product samples or the like.

A further object of the invention is to provide an improved card which constitutes one or more gifts or product giveaways as well as a card.

Still another object of the invention is to provide an improved card which can be easily and inexpensively adapted to contain either a standard video or audio cassette tape and one or more relatively small novelty items, product samples, or other relatively small items of value.

A further object of the invention is to provide an improved card which contains one or more items of value and a compact disk (CD).

Another object of the invention is to provide an improved card which can contain a variety of relatively small novelty items, product samples, or other items of value, and which promotes purchasers to collect a plurality of the cards.

Still another object of the invention is to provide an improved card which is particularly suited for containing one or more novelty items or product samples and a variety of interesting, educational, or advertising information relating to such novelty item or product sample.

Yet a further object of the invention is to provide in improved card which securely maintains one or more novelty items, product samples, or other items of value in one or more particular visible locations on the card during shipping and handling of the card.

Still yet another object of the instant invention is to provide in improved card which securely maintains both a CD and one or more novelty items or product samples within the card assembly, but which provides for easy removal of both the CD and the novelty items or product samples from the card.

These and other objects and advantages are achieved by the present invention, which provides a card device including a front card portion and a back card portion hinged together in a manner which enables the card to be opened and closed. The back card portion includes spaced front, rear and side panels which define an interior space therebetween. In one embodiment, the card further includes a tape cartridge, such as a VHS video or audio cassette tape, having a drive gear defining an open recess in the tape cartridge, and one or more novelty item or product sample carrier devices including a novelty item or product sample carrier portion containing one or more novelty items or product samples. The carrier devices and the tape cartridge are positioned in nested relation within the interior space of the back card portion such that the carrier portions are received within the open recesses in the tape cartridge.

In accordance with another aspect of the invention, the rear panel or front panel of the back card portion includes cut-out portions therein for enabling the novelty items or product samples to be seen therethrough.

In accordance with another aspect of the invention, the novelty item is one or more gemstones, and preferably a birthstone, and the tape cartridge includes information relating to the gemstone or birthstone.

In accordance with yet another aspect of the invention, the novelty items are one or more product samples, such as a small consumable food, dietary supplement, or pharmaceutical product, and the tape cartridge includes advertising and educational information relating to such product samples.

In accordance with a further aspect of the invention, the carrier devices include transparent material defining a window which enables the novelty items or product samples to be seen therethrough, and further wherein the windows are aligned with the cut-out portions in the card.

In accordance with yet another aspect of the invention, the carrier devices include a first layer of material with a hole cut therein, transparent material positioned over the hole, and a backing device for holding the novelty items or product samples in a predetermined position against the transparent material.

In accordance with still another aspect of the invention, the backing device is made of a compressible material which enables the backing device to compress around the novelty items or product samples to hold such items in a stable position in the card device.

In accordance with an alternative embodiment, the invention provides a card device including a front card portion and a back card portion having an interior space, and an insert device having a first recessed portion, with an audio cassette tape received therein, and a second recessed portion. The card device further includes a novelty item or product sample carrier device including a carrier portion containing one or more novelty items or product samples. The carrier device and the insert device are positioned in nested relation within the interior space such that the carrier portion is received within the second recess in the insert device.

An improved card structure having a novelty item, product sample, or other item of value, contained therein in a secure and visible manner along with a video and/or audio cassette or compact disk is described in detail in U.S. Pat. No. 5,954,194 issued to the inventor herein on Sep. 21, 1999, the disclosure of which is incorporated herein in its entirety by reference.

In accordance with yet another alternative embodiment of the instant invention, the invention provides a card device including a front card portion and a back card portion hinged together in a manner which enables the card to be opened and closed and which defines a card interior therebetween. A compact disk carrier is mounted within the card interior and has a central raised portion on a front side thereof which defines a first open recess in the back side thereof, and has an edgewise raised portion along an interior edge thereof which defines a second open recess in the back side thereof. The card device further includes a compact disk positioned on the front side of the disk carrier such that the central hole in the compact disk receives the raised portion on the front side thereof. The card device further includes one or more novelty item or product sample carrier devices including a carrier portion containing one or more novelty items or product samples. The carrier devices and the compact disk carrier are positioned in nested relation within the interior space of the card, such that the carrier portions are received within the first and second open recesses in the back side of the compact disk carrier. The compact disk preferably includes audio and/or video information relating to the novelty item or product sample.

In accordance with a further aspect of this alternative embodiment of the invention, the compact disk carrier is hingedly mounted at one end thereof to the back card portion, with the opposite end of the disk carrier being removably held within the back card portion through use of a detent integrally formed on an exterior sidewall of the disk carrier. Such assembly allows a user to open the card by pivoting the front card portion with respect to the back card portion to reveal the disk carrier held inside the card, and in turn to readily pivot the disk carrier with respect to the back card portion to reveal the novelty items or product samples positioned between the disc carrier and the back card portion, thus easing the task of removing such novelty items or product samples from the card assembly without requiring the full removal of the disk carrier.

In accordance with yet another aspect of this alternative embodiment of the invention, the card device includes a conventional transparent compact disk case which defines the front card portion and the back card portion. The card device further includes sheet material with indicia for the card inserted on the inside of the front and back card portions of the card.

In accordance with still another aspect of this embodiment of the invention, the sheet material inserted in the back card portion includes one or more cut-out portions at locations therein which correspond to the locations of the novelty items or product samples, thereby enabling the novelty items or product samples to be seen through the back of the card device.

BRIEF DESCRIPTION OF THE DRAWINGS

Other features, objects and advantages of the subject invention will become apparent from a study of the following specification when viewed in light of the accompanying drawings, in which:

FIG. 1 shows a front perspective view of the card device of the present invention;

FIG. 2 shows a rear perspective view of the card device of the present invention with a video tape being inserted therein;

FIG. 3 shows a front perspective view of the card device of FIGS. 1 and 2 in its open position;

DETAILED DESCRIPTION OF THE PREFERRED EMBODIMENTS

Figure 4:
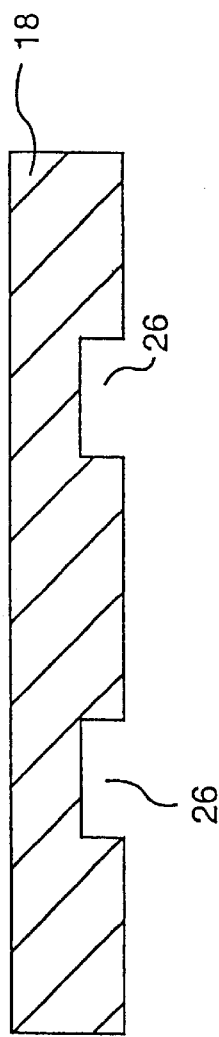
FIG. 4 shows a side sectional view of a video tape as used in one embodiment of the present invention.

Referring now to the drawings, wherein like reference numerals designate similar parts throughout the various views, and more particularly to FIGS. 1–3 thereof, the card device 10 of the instant invention includes a front portion 12 and a back portion 14 connected together along an inner edge 16, such that the front and back portions 14 and 16 cooperate to form a card structure that can be opened, as shown in FIG. 3, and closed, as shown in FIG. 1, like a conventional card. The front and back portions 12 and 14 may be made of any suitable material, such as card stock or the like.

The front portion 12 is similar to a conventional card, in that it is made of a single sheet of card stock and includes a front and back surface 12a and 12b, respectively. The back portion 14 includes a front panel 14a, back panel 14b and side panels 14e and 14d, which together define an interior space generally shaped in the form of a video and/or audio tape sleeve. The size of the card and panels can be such that the sleeve is designed to receive and hold a conventional VHS video tape 18, an audio tape or any other suitable storage medium. The back portion 14 may also include a closure panel 14f (see FIG. 8) for closing the sleeve once the video 18 is slid into the sleeve.

As seen in FIG. 2, the card device 10 is particularly designed to carry and display an item 20, such as a novelty item, product sample or any other relatively small item of value or perceived value. The back portion 14b preferably includes a cut-out section 22 defining a window 24 which enables the novelty item or product sample 20 to be seen therethrough.

In accordance with a first preferred embodiment of the card device 10, the back portion 14 of the card 10 is constructed to carry a standard VHS video tape 18. As shown in FIG. 4, the video tape 18 includes drive gears which define open recesses 26. As explained in more detail below, the instant invention uses at least one of the recesses 26 in an advantageous manner to secure and contain the novelty item or product sample 20 or other item within the card 10.

Figure 5:
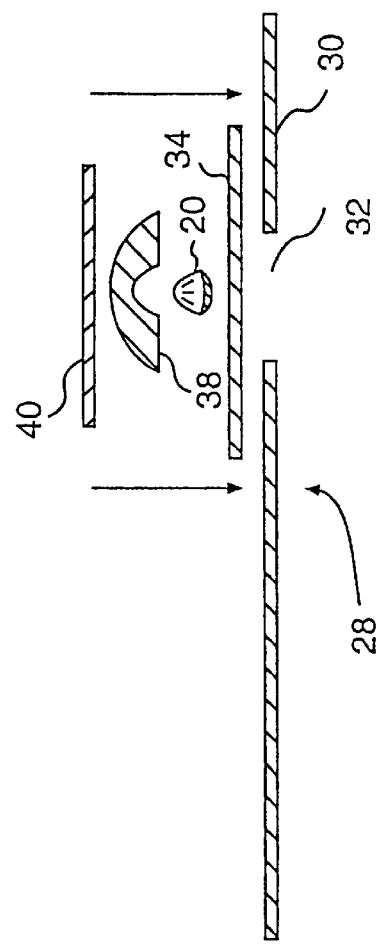
FIG. 5 shows an exploded sectional view of a preferred embodiment of the novelty item or product sample carrier of the instant invention.
Figure 7:
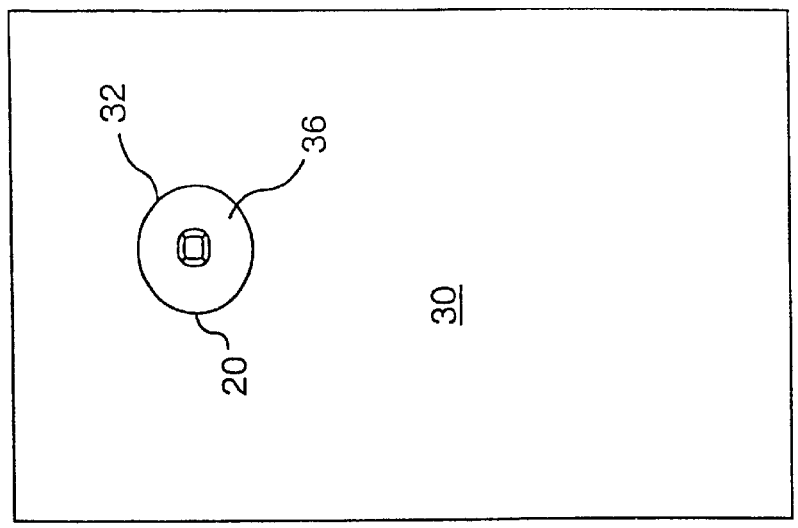
FIG. 7 shows a front plan view of the novelty item or product sample carrier of FIG. 5.

The card device 10 further includes an item carrier 28, as shown most clearly in FIGS. 5 and 7. This carrier 28 preferably includes a first layer 30 made of suitable card stock and having a hole 32 cut therein, a second layer of transparent material 34 secured to the first layer 30 and having a size which covers the hole 32 to define a transparent window 36 for enabling the novelty item or product sample to be seen therethrough. The transparent material is preferably a durable clear plastic material, such as Mylar or a material sold under the trademark LEXAN, which is difficult to break, thereby deterring or preventing theft of the novelty item or product sample when the cards are displayed for sale or elsewhere. The carrier 28 further includes a backing device 38 for the novelty item or product sample 20, which holds the item in its proper place and position so that it can be viewed through the window 36. The backing device 38 is preferably a size which covers the entire opening 32, so that only the item and the backing can be seen through the opening 32. The backing device 38 can be glued directly to the transparent material 34 or the first layer 30, or a layer of adhesive material 40, such as tape can be used to secure the backing device 38 as part of the carrier 28. The backing device 38 is preferably a compressible material such as a foam-like material to enable the backing to be compressed around the novelty item or product sample for securely holding the item in its desired position. The backing device 38 may also be constructed of colored foil or plastic material to enable a decorative display of the novelty item or product sample 20. The backing device 38 is constructed to have a size and shape which enables it and the item 20 to fit into the recess 26 in the video tape 18. Alternatively, the first layer could be made entirely of a transparent material without the cut-out portion 32, thereby eliminating the need for part 34. The layer 30 preferably has a size which substantially corresponds to the size of the video tape 18, thereby helping to maintain the novelty item or product sample 20 in its proper position within the card device 10.

Figure 6:
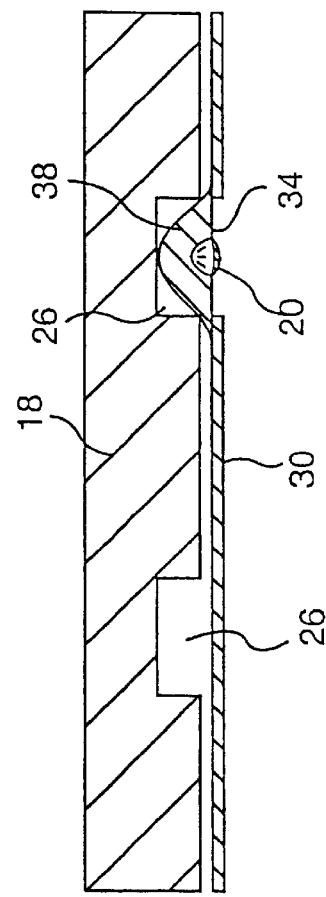
FIG. 6 shows a sectional view of the video tape and novelty item or product sample carrier of FIGS. 4 and 5 positioned in a nested configuration, in accordance with the present invention.

As can be seen in FIG. 6, the carrier device 28 is constructed to enable the portion of the carrier which carries the novelty item or product sample 20 to be inserted into the recess 26 in the audio tape, thereby enabling the tape 18 and the carrier 28 to be placed in the nested relationship shown in FIG. 6. This configuration provides a compact and convenient size for the combined tape 18 and the carrier 34 for incorporation into the card 10. If fact, this configuration provides a tape and securely mounted novelty item or product sample in a size that is hardly larger than the tape itself.

Figure 8:
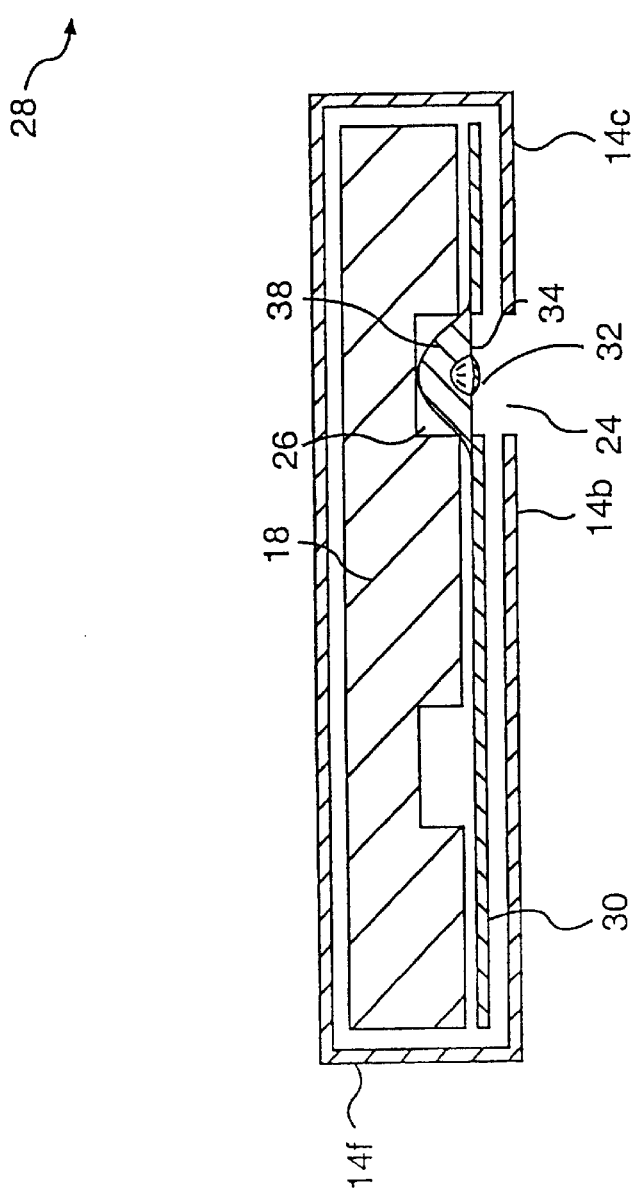
FIG. 8 shows a side sectional view of the nested video tape and novelty item or product sample carrier of FIG. 6 positioned within the card of FIGS. 1–3, in accordance with the present invention.

As shown in FIG. 8, the nested tape 18 and carrier 28 are together slid inside the sleeve defined by the back portion 14 of the card 10. The recess 26 in the tape, cut-out portion 32 defining the window 36 in the item carrier 28, and the hole 22 in the back panel 14b of the card are all aligned such that the novelty item or product sample 20 can be seen through the back of the card in a secure and decorative manner. Once assembled the card 10 provides a combination card and item carrier and display device including a novelty item or product sample and a video/audio cassette.

It is noted that in the above-described embodiment an audio cassette could be used instead of a VHS tape 18, by downsizing the card 10 and using the audio cassette drive gear recess in the same manner described above for the video tape embodiment.

It is also noted that while the Figures and above discussion reflect the positioning and display of a single novelty item or product sample in only one of the recesses of the tape, one or more novelty items or product samples could in fact be positioned in one or both of the recesses in the tape, and displayed to the exterior of the carrier as described above, all without departing from the spirit and scope of the instant invention.

Figure 9:
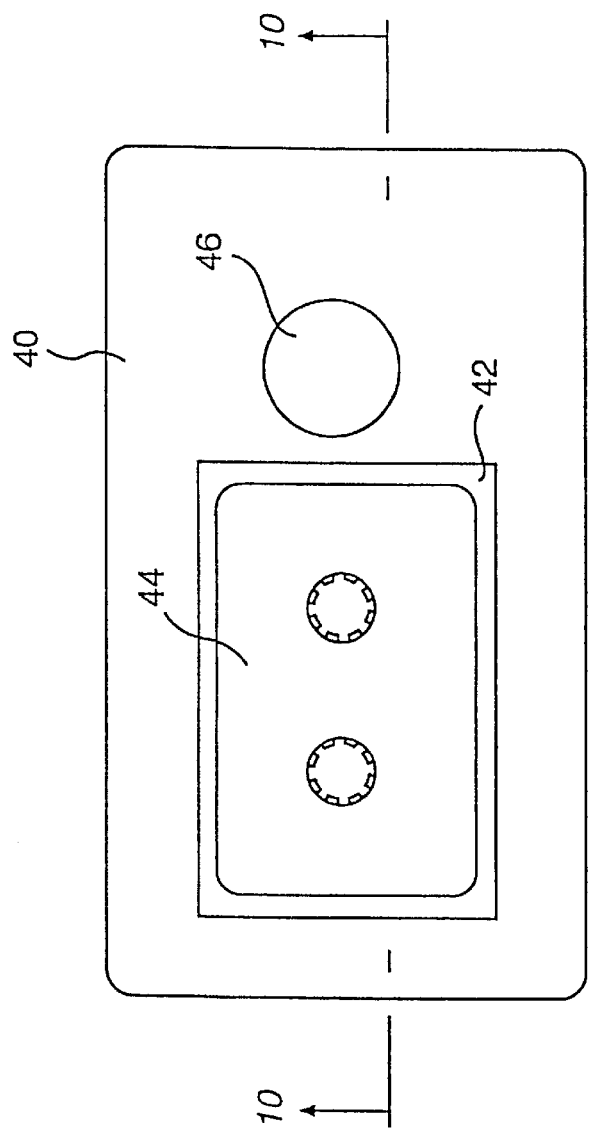
FIG. 9 shows a front plan view of an insert device used in an alternative embodiment of the present invention, wherein an audio cassette is included in the card.
Figure 10:
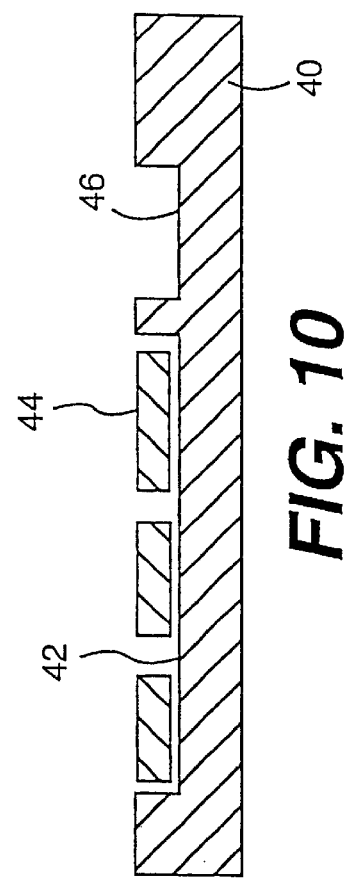
FIG. 10 is a side sectional view of the insert device along line 10—10 of FIG. 9.

An alternative embodiment designed for incorporating a standard audio tape is shown in FIGS. 9 and 10, wherein it is desired to have card 10 be substantially the same size as the VHS video tape embodiment described above. This alternative embodiment enables the same size and shape novelty item or product sample carrier 28 to be interchangeably used in the video and audio tape embodiments of the invention. In this embodiment, an insert device 40 is provided for holding the audio cassette and providing a recess for the novelty item or product sample carrying portion of the carrier 28. The insert device 40 may be made of cardboard, recycled material, styrofoam, vacuum formed plastic, or any other suitable material. The insert device 40 includes a first recess 42 having a size and shape suitable for holding an audio cassette 44, and a second recess 46 having a size, shape and location which substantially corresponds to and simulates the video tape drive gear recess 26 in the first embodiment described above. This enables the novelty item or product sample carrier 28 to be nested with the insert device 40, in the same manner as in the video tape embodiment, prior to being slid into the sleeve of the card 10.

The video tape 18 and audio tape 44 preferably contain information which relates to the novelty item or product sample. For example, if the item is a gemstone, the information on the tape may provide specific information about the gemstone. The tape could also include a customizable portion which includes a personalized massage with the card, thereby enabling the purchaser of the card to place a personalized message for the recipient of the card on the tape. In a more specific embodiment, the card is a birthday card and the item placed in carrier 28 is a birthstone. A set of twelve such cards can be made each being tailored to one of the twelve months of the year and containing a specific birthstone for each month, respectively. Each card can be color coordinated to the color of the birthstone and may include a detailed photograph or drawing of the birthstone on the front cover 12a thereof. Information and decorative indicia may also be printed in any suitable location on the card. For example, the card could include a picture of a birthflower corresponding to the birthstone, information on an interesting event occurring in that month or an interesting person born in that month, and/or information on the stone itself, including famous examples of the stone, hardness, care and cleaning instructions, or any other desired information. The card may also include a portion for enabling the purchaser to provide a personalized written message on the card. The tape may include even more detailed information relating to the gemstone. The recipient of the card 10 can remove the tape and the item carrier and have the option of removing the stone and using it in a piece of jewelry. As a result of the design of the instant invention, the gemstone and tape can be removed from the card without damaging the card.

Likewise, if the item is a product sample, such as a small consumable food product, dietary supplement, or pharmaceutical product, the information on the tape may provide advertising information relating to the sampled product or other products, or may provide educational information relating to such product's use, benefits, costs, and the like.

Figure 11:
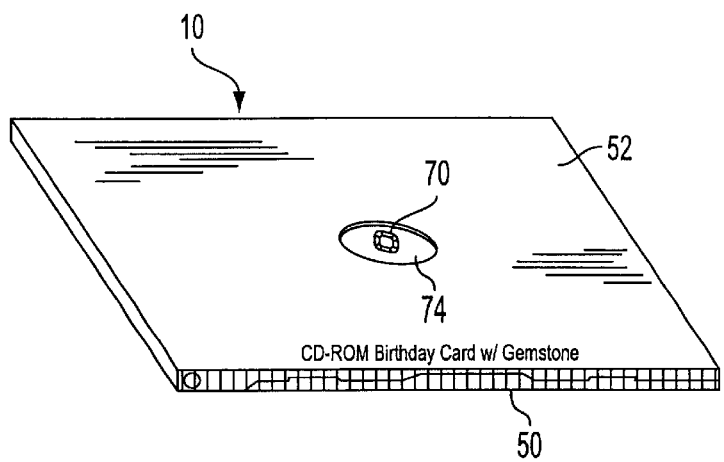
FIG. 11 shows another alternative embodiment of the present invention wherein a compact disk and compact disk case are used.
Figure 12:
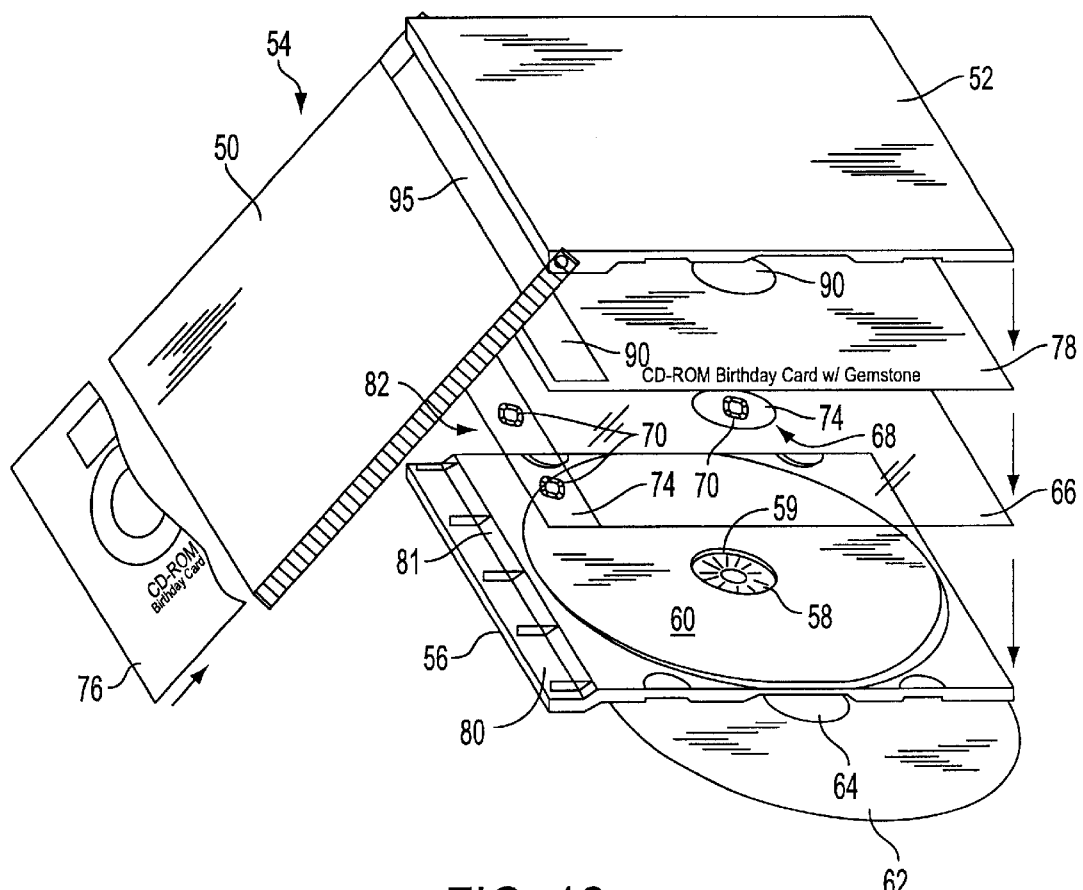
FIG. 12 shows an exploded view of the embodiment of the instant invention shown in FIG. 11.

An alternative embodiment of the instant card device 10 is shown in FIGS. 11 and 12. This embodiment is particularly adapted for incorporating a compact disk (CD), or other similarly shaped storage medium, in the card instead of a video or audio tape. The compact disk may be a CD-ROM, an interactive CD, recordable CD, a digital video disk (DVD), or any other similar type of storage medium. This embodiment includes a front card portion 50 and a back card portion 52 which are hinged together in a manner which enables the card 10 to be opened and closed. Preferably, the front and back portion constitute a conventional compact disk case 54, sometimes known as a "jewel case" or "CD box". However, any other suitably designed case 54 can be used. The case 54 has an interior space when closed. Inside the case 54 is a compact disk carrier 56 mounted within the card interior and having a central raised portion 58 and an elongate edgewise raised portion 80 on a front side thereof. The central raised portion 58 on the front side defines a first open recess 59 on the back side 60 of the disk carrier 56, and the elongate edgewise raised portion 80 defines a second elongate open recess 81 on the back side 60 of the disk carrier 56. The card 10 further includes a compact disk 62 positioned on the front side of the compact disk carrier 56, such that the central hole 64 on the compact disk receives the central raised portion 58 on the front side of the disk carrier 56. The card 10 further includes a novelty item or product sample carrier device 66 including a first carrier portion 68 containing a first novelty item or product sample 70, and a second carrier portion 82 containing one or more additional items 70. The carrier device 66 is preferably constructed in the manner described above with respect to the embodiment shown in FIG. 12, wherein a transparent window 74 is provided over each carrier portion 68 and 82, behind which items 70 are mounted with a suitable backing device or layer. The carrier device 66 has a size and shape which enables it and the compact disk carrier 56 to be positioned in nested relation within the interior space of the card 10. More particularly, the central carrier portion 68 is received within the open recess 59 in the back side 60 of the compact disk carrier 56, and the edgewise carrier portion 82 is received within the open recess 81 in the back side 60 of compact disk carrier 56. In other words, the recesses 59 and 81 in the disk carrier are used in the same manner as the drive gear recess 26 in the video tape embodiment described above.

Moreover, compact disk carrier 56 may be formed from a transparent material, in turn enabling any novelty items or product samples positioned within elongated recess 81 to be viewed from either the front or back of card 10. It should be noted that front end portion 50 is provided an edge-wise cutaway portion 95, such that front card portion 50 will not obscure from view elongated recess 81 or its contents when the front card portion 50 is closed.

Preferably, the card case 54 is made of transparent material, and the card additionally includes a piece of sheet material 76 and 78, such as paper or card stock, inserted on the inside of the front card portion 50 and the inside of the back card portion 52, such that the sheets can be seen through the transparent case 54. The sheet 78 inside the back card portion 52 preferably contains holes 90 therein for enabling the novelty items or product samples 70 to be seen therethrough. In the same manner as explained above, the sheet material can include printed information or decorative indicia, to provide a birthday card, advertising message, product description, or the like. The sheet 78 and novelty item or product sample carrier 66 may alternatively be constructed as a single element. The compact disk 62 preferably includes the same type of information as explained above with respect to the audio and video tape 18 and 44.

Figure 13:
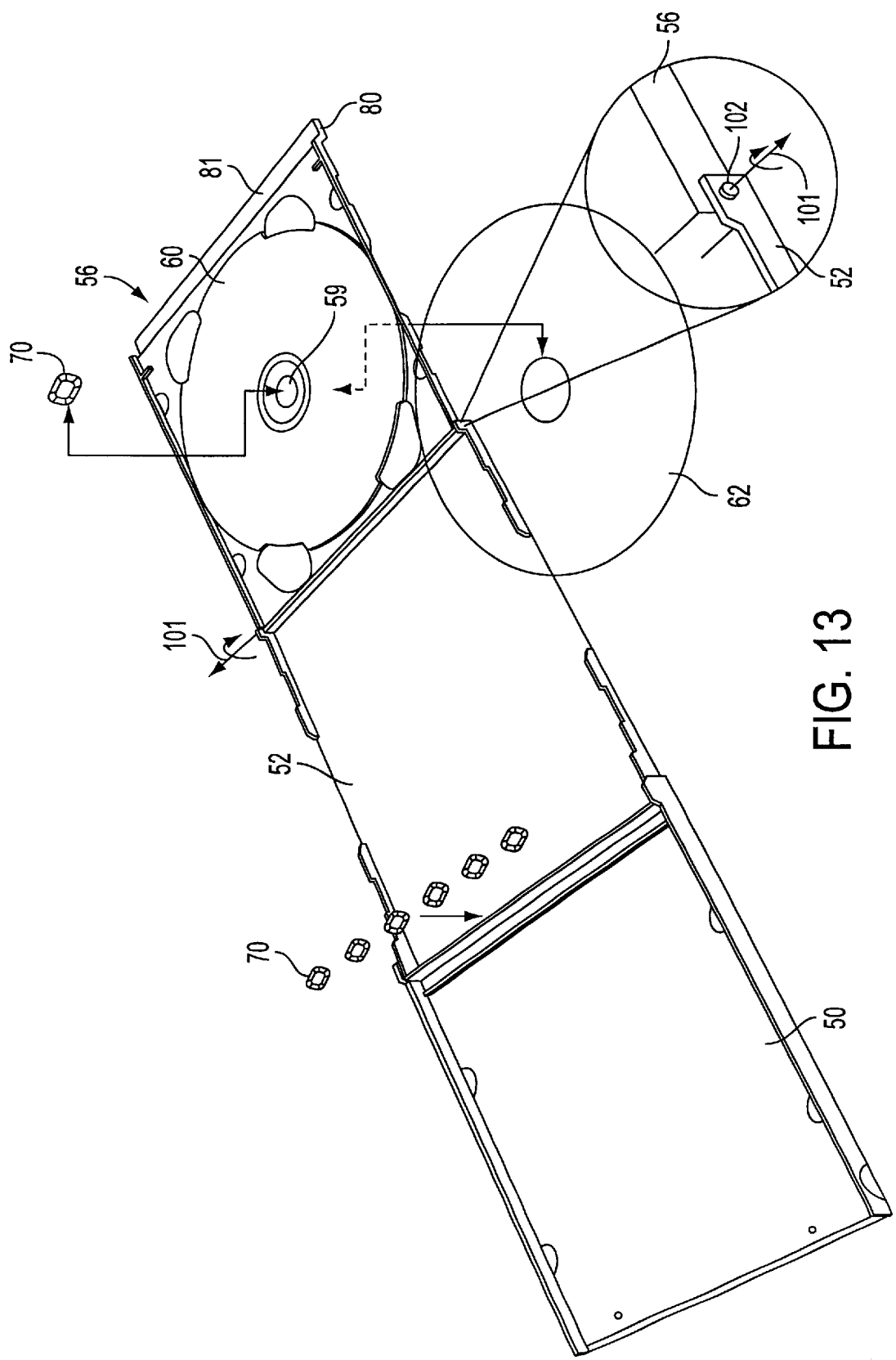
FIG. 13 shows a front exploded view of an alternate embodiment of the present invention wherein a compact disk and compact disk case are used, with a compact disk carrier being hingedly attached to the back portion of the case.
Figure 14:
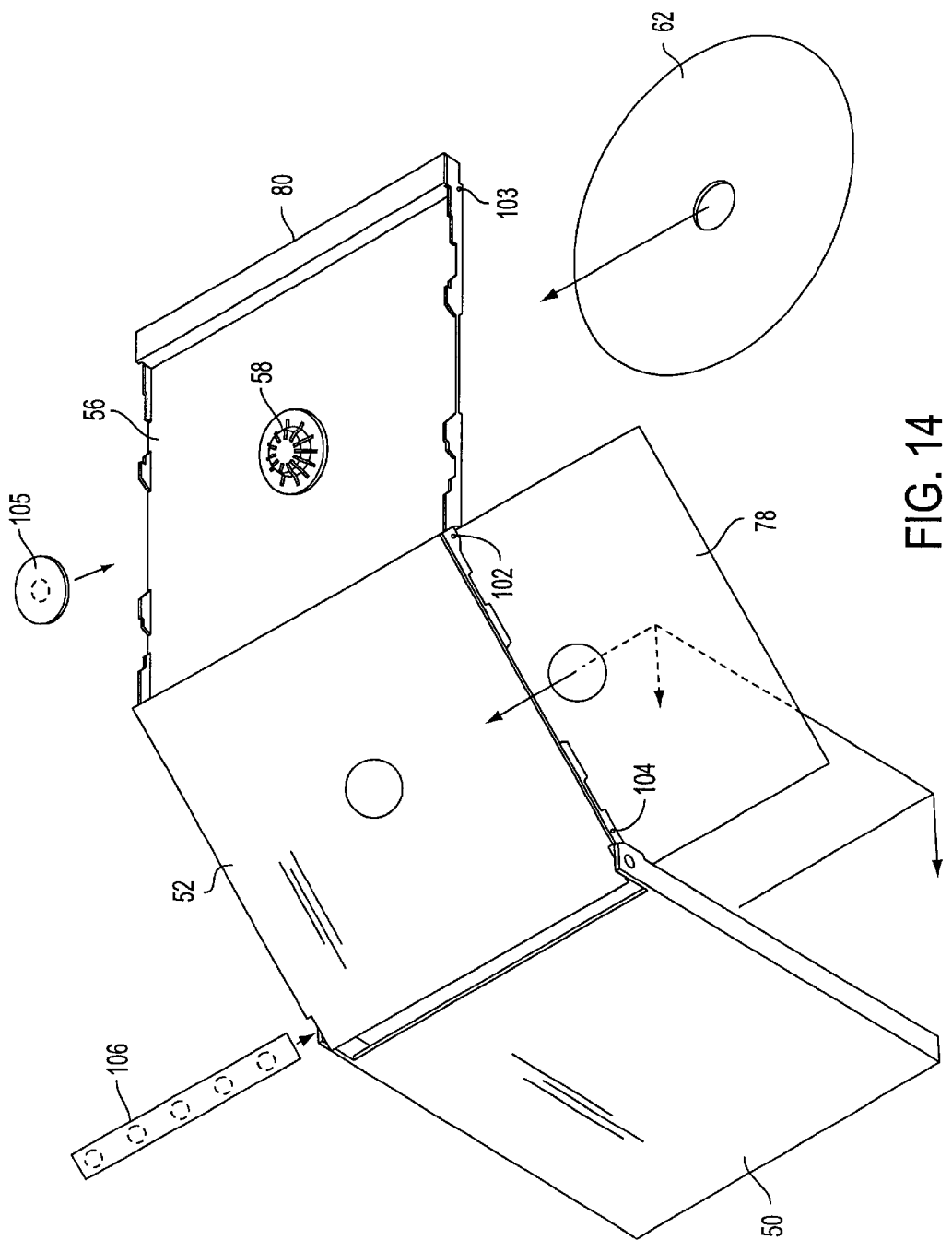
FIG. 14 shows a rear exploded view of the card assembly of FIG. 13.

Yet another alternate embodiment of the card device 10 adapted for incorporating a compact disk 62 is shown in the front and rear exploded views of FIGS. 13 and 14, respectively. As shown in the front exploded view of FIG. 13, disk carrier 56 is hingedly attached to back portion 52 so as to be pivotal about a pivot line 101 from a nested position, in which novelty items or product samples 70 are sandwiched between disk carrier 56 and back portion 52 as described above, to an open position, in which a user may readily access and remove from the interior novelty items or product samples 70. In order to enable such pivotal motion of disk carrier 56 with respect to back portion 52, disk carrier 56 is provided with a hinge component, such as a pin 102 integrally formed on a sidewall of disk carrier 56 and extending through an opening in the sidewall of back portion 52 adjacent an outside corner thereof (as shown in the detail view in FIG. 13). Preferably, both a top and bottom edge of disk carrier 56 are provided with such an integral pin 102 to ensure consistent and uniform pivotal motion of disk carrier 56 about pivot line 101. Moreover, to ensure that novelty items or product samples 70 are securely held in place within the interior of card assembly 54, disk carrier 56 is preferably provided a detent 103 in the form of a slightly outwardly protruding nub integrally formed in the sidewall of disk carrier 56 adjacent elongate edgewise raised portion 80 and configured for engagement with an opening 104 formed on the sidewall of back portion 52. Detent 103 is sufficiently small in size, and back portion 52 is sufficiently resilient, that disk carrier 56 may be held in a closed position (with novelty items or product samples 70 sandwiched between disk carrier 56 and back portion 52) without risk of inadvertently dislodging, while enabling a user to open the compartment with only minimal effort by gripping elongate edgewise raised portion 80 of disk carrier 56 and pivoting the disk carrier about pivot line 101.

While novelty items or product samples 70 may be held within the interior of back portion 52 using a carrier device as set forth above and as shown in FIG. 12, alternately, a carrier device 105 may be used which is sized to fit within open recess 59 of disk carrier 56, such carrier device 105 again comprising a transparent window provided over a suitable backing device or layer, with novelty items or product samples 70 being sandwiched between the two. A similarly configured elongate carrier device 106 may likewise be provided which is sized to fit within elongate open recess 81 of disk carrier 56.

To promote the storage and display of a wide variety of novelty items or product samples, raised portion 58 of disk carrier 56 is preferably formed with an inner raised portion of traditional configuration sized to engage the central hole on a CD, and an outer raised portion surrounding the inner raised portion. The outer raised portion positions the inner raised portion a sufficient distance above the planar top face of a disk carrier 56 so as to position the top face of the CD immediately adjacent the inner face of front card portion 50, as opposed to leaving a gap between the CD and the inner face of front card portion 50 as with traditional CD jewel case assemblies. The outer raised portion is preferably formed as a disk having a thickness approximately twice the thickness of the planar surface of disk carrier 56. It has been found that providing such an outer raise portion formed as a disk with a thickness approximately twice the thickness of the disk carrier 56 maximizes the depth of the recess 59 formed on the underside of disk carrier 56, and thus the storage capacity for novelty items or product samples of varying sizes, while ensuring that the entire card assembly may easily be closed and maintained in a closed state. It should particularly be noted that while prior art assemblies have provided pivoting disk carriers for carrying multiple CD's, none have previously simultaneously provided means on one side for holding a CD, with means on the opposite side for positioning a novelty item or product sample.

Disk carrier 56 is preferably formed from a clear, translucent plastic, thus enabling a consumer to view the novelty items or product samples positioned below elongate edgewise raised portion 80, even when the card assembly rests in a closed position. Likewise, back portion 52 is preferably formed from a clear, translucent plastic so as to provide at least a window through which a consumer may view novelty items and product samples 70 positioned within open recess 59 and elongated recess 81 from the back of the closed card assembly.

It is noted that while the Figures and above discussion reflect the positioning and display of multiple novelty items or product samples in more than one open recess on the back side of the compact disk carrier, either one of the open recesses may be used in lieu of the other, as needed in order to display multiple novelty items or product samples, or items having varying shapes, or to provide for particular graphical displays of information on back sheet 78.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

What is claimed is:

1. A card device, comprising:
    a front card portion and a back card portion hingedly connected together in a manner which enables said card to be opened and closed, said front card portion and said back card portion defining a card interior therebetween;
    a compact disk carrier hingedly mounted to said back card portion within said card interior and having a central raised portion and an edgewise raised portion on a front side thereof, each of said raised portions defining open recesses in a back side of said compact disk carrier, said card device further including a compact disk positioned on the front side of said compact disk carrier such that a central hole on said compact disk receives said central raised portion on said front side thereof,
    said card device further including a first and second item carrier device including a first and second item carrier portion containing at least first and second items, respectively, said first and second item carrier devices and said compact disk carrier being in nested relation within said card interior;
    wherein said first and second item carrier portions are received within said open recesses in said back side of said compact disk carrier.

2. A card device as define in claim 1, wherein said card device includes a conventional transparent compact disk case which defines said front card portion and said back card portion, and further including sheet material inserted on an inside of said front card portion and said back card portion, said sheet material including indicia for the card.

3. A card device as defined in claim 1, wherein said items comprise gemstones.

4. A card device as defined in claim 1, wherein said items comprise product samples.

5. A card device as defined in claim 2, wherein said sheet material inserted in said back card portion includes a plurality of cut-out portions at locations therein which correspond to the locations of the items to enable the items to be seen through said cut-out portions.

6. A card device as defined in claim 5, wherein said first and second item carrier devices each include transparent material defining a window which enables said items to be seen therethrough, and further wherein said windows are aligned with said cut-out portion.

7. A card device as defined in claim 1, wherein said compact disk carrier is transparent.

8. A card device, comprising:
    a front card portion and a back card portion hingedly connected together in a manner which enables said card to be opened and closed, said front card portion and said back card portion defining a card interior therebetween;
    a compact disk carrier hingedly mounted to said back card portion within said card interior and having an edgewise raised portion on a front side thereof, said raised portion defining an open recess in a back side of said compact disk carrier, said card device further including a compact disk positioned on the front side of said compact disk carrier;

said card device further including an item carrier device including an item carrier portion containing at least one item, said item carrier device and said compact disk carrier being in nested relation within said card interior, wherein said item carrier portion is received within said open recess in said back side of said compact disk carrier; and sheet material inserted on an inside of said front card portion and said back card portion, said sheet material inserted in said back card portion defining a cut-out portion at a location therein which corresponds to the location of said at least one item to enable the item to be seen through said cut-out portion.

9. A card device as defined in claim 8, wherein said at least one item is at least one gemstone.

10. A card device as defined in claim 8, wherein said at least one item is at least one product sample.

11. A card device as defined in claim 8, wherein said carrier device includes transparent material defining a window which enables said at least one item to be seen therethrough, and further wherein said window is aligned with said cut-out portion.

12. A card device as defined in claim 8, wherein said compact disk carrier is transparent.

\* \* \* \* \*